United States Patent [19]
Pierce

[11] Patent Number: 6,152,486
[45] Date of Patent: Nov. 28, 2000

[54] ANTI-CREEP DEVICE

[75] Inventor: William C. Pierce, Muskegon, Mich.

[73] Assignee: Holland Neway International, Inc., Muskegon, Mich.

[21] Appl. No.: 09/329,754

[22] Filed: Jun. 10, 1999

Related U.S. Application Data

[60] Provisional application No. 60/089,193, Jun. 12, 1998.

[51] Int. Cl.[7] .................................................. B60R 21/00
[52] U.S. Cl. ............................................................. 280/755
[58] Field of Search ............................................. 280/755

[56] References Cited

U.S. PATENT DOCUMENTS

| | | | |
|---|---|---|---|
| 3,545,635 | 12/1970 | Montan | 280/755 |
| 4,536,009 | 8/1985 | Ashworth | 280/755 |
| 5,312,119 | 5/1994 | Schneider et al. | 280/6.1 |
| 5,890,737 | 4/1999 | Hutka | 280/755 |
| 5,957,494 | 9/1999 | Yahiaoui | 280/755 |

FOREIGN PATENT DOCUMENTS

| | | |
|---|---|---|
| 0 567 189 A1 | 4/1993 | European Pat. Off. . |
| 2 588 807 | 10/1985 | France . |
| 2 309 554 | 9/1974 | Germany . |
| 1247014 | 9/1971 | United Kingdom . |
| WO. 96/33894 | 10/1996 | WIPO . |

*Primary Examiner*—J. J. Swann
*Assistant Examiner*—L. Lum
*Attorney, Agent, or Firm*—Rader, Fishman, Grauer & McGarry, an office of Rader, Fishman & Grauer

[57] ABSTRACT

An anti-creep device for a trailing arm suspension. The anti-creep device comprises an arm that is extended and retracted relative to a trailer frame and trailing arm of the suspension to prohibit their relative movement. The arm is connected to either the trailer frame or trailing arm by a frangible coupling designed to break at a predetermined load to prevent damage to the trailer or suspension from overloading or operation when the arm is extended.

20 Claims, 4 Drawing Sheets

ANTI-CREEP DEVICE

RELATED PATENT APPLICATIONS

This application claims priority on U.S. provisional patent application Ser. No. 60/089,193 filed Jun. 12, 1998.

BACKGROUND OF THE INVENTION

1. Field of the Invention

The invention relates to an anti-creep device for use in a trailer suspension, and, more specifically, to a breakaway anti-creep device. The invention serves to retard the forward and downward movement of a trailer during loading, loss of air spring pressure, or other "stationary" times to limit the creep of the trailer from a loading dock or parked position and to breakaway if the load on the anti-creep device exceeds a predetermined amount to prevent damaging the suspension or trailer.

2. Description of the Prior Art

Many trailers have trailing arm suspensions with air springs to control the relative position of the frame with respect to an axle and also to cushion the relative movement of the axle toward the frame due to bumps in the road. In the loading or unloading of a trailer, the trailer is typically backed up against a dock by the tractor. The operator then lowers the front dolly legs on the trailer until they touch the ground and then removes the tractor. In storage situations the tractor may or may not be connected to the trailer. Although the air springs are pressurized by the tractor's air compressor during transport and stationary times, the air compressor is normally off during loading or unloading operations, preventing the addition or exhaustion of pressurized air.

As an empty trailer is loaded, the force from the weight of the goods being transferred to the trailer and the loading equipment, such as a forklift or a handcar, lowers the rear portion of the frame with respect to the axle. Because the compressor is off during the loading operation, the air pressure in the air spring is not adjusted to compensate for the increased load. While the rear portion of the trailer frame moves downwardly, the front portion of the trailer frame is substantially fixed at the height of the dolly and the trailer frame effectively rotates about the contact point of the dolly with the ground. The downward movement of the rear portion of the trailer frame results in the pivotal movement of the pivotal connection between the trailer frame and the suspension trailing arm. This pivotal movement results in the slight rotation of the wheel to move the trailer forward. In other words, the trailer tends to move away from the loading dock. This movement is referred to as "creep." Trailer creep can create hazards for loading.

One solution for trailer creep is to moveably mount a bar to the frame rail and move the bar to a use position between the frame rail and the axle or trailing arm. Since the bar extends between the frame rail and the suspension, it begins carrying the load of the trailer once the air spring sufficiently collapses to the point where the bar contacts the axle or trailing arm. Depending on the air spring type and capacity and the weight of the goods loaded in the trailer, it is possible to overload the trailing arm or axle through the bar, causing damage or failure. Also, if the bar is not rotated out of the way during vehicle operation, it can cause major damage to the trailer from bump inputs while going down the highway. International publication WO 97/37864 illustrates several examples of such an anti-creep device and is incorporated by reference.

Therefore, there is a need to reduce or eliminate the creep associated with a trailer during loading while preventing damage to the trailing arm or axle. The anti-creep solution must also be simple, reliable, and inexpensive if it is to be commercially viable. Further, the anti-creep solution must also not interfere with the normal function of the trailing arm suspension during its normal operation.

SUMMARY OF THE INVENTION

The invention relates to an anti-creep device alone or in combination with a trailing arm suspension. The trailing arm suspension comprises a pair of trailing arms, each having a first end that is rotatably mounted to opposite sides of a trailer frame. An air spring is disposed between each trailing arm and the trailer frame to resiliently resist the upward movement of the trailing arms with respect to the frame. An axle is connected to the trailing arms and has opposite ends adapted for mounting a wheel thereto. The anti-creep device according to the invention comprises at least one support arm mounted to one of the trailer frame and trailing arm suspension for rotational movement between a retracted position and an extended position. The support arm in the extended position is adapted to extend between the trailing arm and trailer frame to prevent relative movement of the axle toward the trailer frame and thereby prevent trailer frame creep. The support arm in the retracted position is disengagable from the suspension and frame so that the axle is free to move relative to the frame.

The improvement to the anti-creep device includes a bracket rotatably mounted to one of the frame and suspension and a frangible coupling connecting the arm to the bracket. The frangible coupling is designed to fail at a predetermined load below that at which damage will result to the trailer or suspension during loading or operation when the support arm assembly is in the extended position.

The frangible coupling is preferably at least one or more shear bolts or a fracture zone in the support arm. The fracture zone can include a reduced cross section or a portion of the arm having reduced shear strength properties.

Preferably, the anti-creep device further includes a rod adapted for rotatable movement relative to the frame rail and trailing arm with the bracket being mounted to the rod whereby rotation of the rod rotates the arm between the extended and retracted positions. The bracket is preferably a plate mounted to the rod. The plate can define an opening in which a portion of the arm is received whereby when the frangible coupling breaks the arm will slide within the axial opening.

BRIEF DESCRIPTION OF THE DRAWINGS

The invention will now be described with reference to the drawings wherein.

DETAILED DESCRIPTION OF THE PREFERRED EMBODIMENTS

Figure 1:
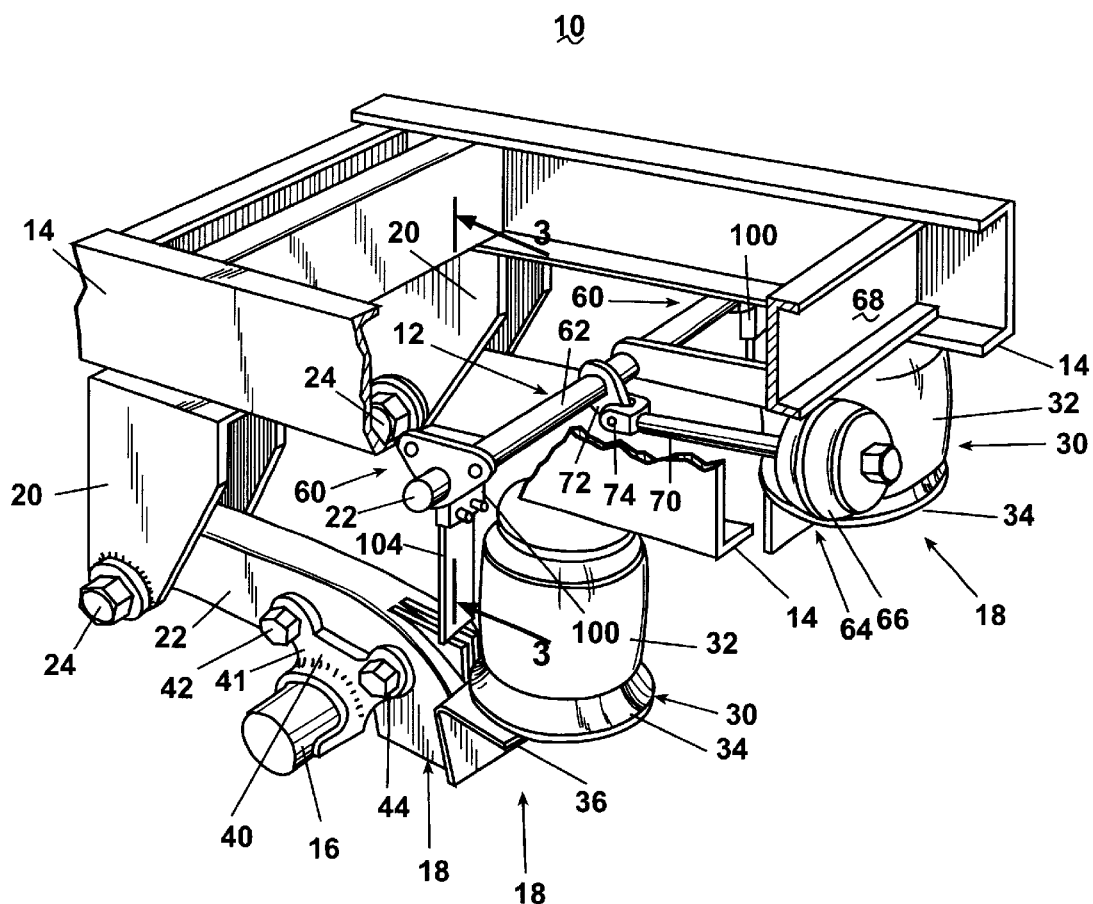
FIG. 1 is a cutaway view of a trailing arm suspension illustrating the anti-creep device according to the invention in a use position.

Referring now to FIG. 1, a trailing arm suspension 10 is mounted to longitudinal frame rails 14 of a trailer frame and supports an axle 16 to which wheels (not shown) are mounted on opposite ends of the axle 16. In a typical trailer application, two trailing arm assemblies 18 are used to mount the axle 16 to the frame rails 14. Each trailing arm assembly 18 is mounted to an opposite frame rail 14 and supports opposing ends of the axle 16. For convenience, only one of the trailing arm assemblies 18 will be described in detail.

The trailing arm assemblies 18 comprise a hanger bracket 20 fixedly mounted to the frame rail 14 and to which is rotatably mounted a trailing arm 22 by means of a bushed connection 24 at the forward end of the trailing arm 22. The rearward end of the trailing arm 22 mounts an air spring 30 at a lower end thereof, which is connected to the frame rail 14 at its upper end. The air spring 30 resiliently resists upward movement of the trailing arm 22 with respect to the frame and comprises an air bag 32 mounted to the frame rail 14 and a piston 34 mounted to a platform 36 on the trailing edge of the trailing arm 22. As the trailing arm 22 rotates, the piston 34 is urged into the air bag 32 to resiliently retard movement of the trailing arm 22 toward the frame rail 14.

The axle 16 is mounted to the trailing arm 22 by an axle mounting bracket 40 having opposing plates 41, which are connected to the trailing arm 22 through two bushed connections 42 and 44. A shock absorber (not shown) can be mounted between the frame rail 14 and the axle bracket 40 to dampen the movement of the trailing arm 22 with respect to the frame.

Figure 2:
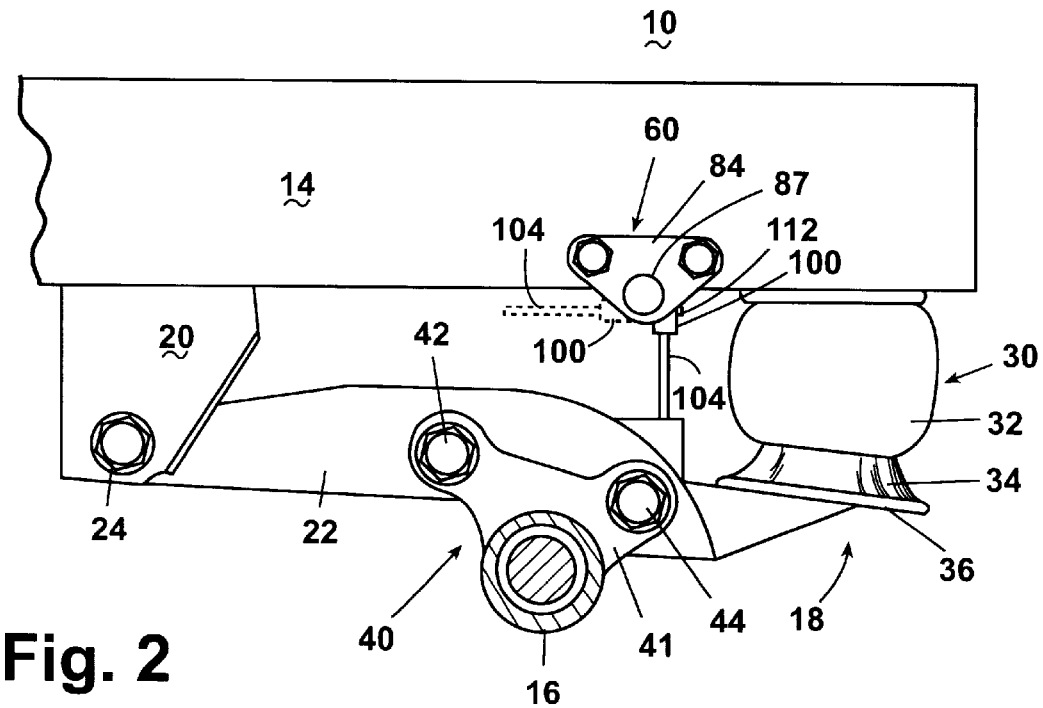
FIG. 2 is a side view of the trailing arm suspension of FIG. 1 illustrating the anti-creep device in a stored position in phantom.
Figure 3:
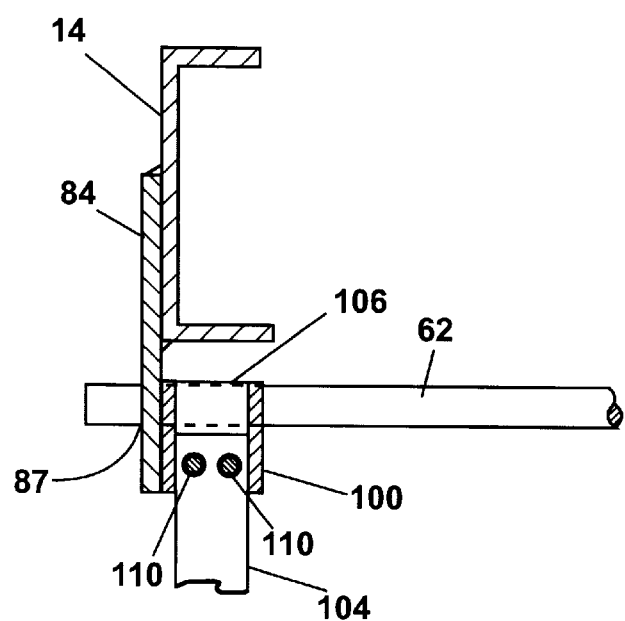
FIG. 3 is a sectional view of the anti-creep device taken along line 3—3 of FIG. 1.

Referring now to FIGS. 1–3, the anti-creep device 12 according to the invention comprises two opposing anti-creep assemblies 60 mounted to a connecting shaft 62, which spans the frame rails 14. An air actuator 64 has a housing 66 mounted to a frame crossbeam 68 and an actuating arm 70 connected to a lever 72 on the shaft 62 by a clevis 74 on the end of the actuating arm. The air actuator 64 rotates the shaft 62 between first and second positions, which correspond to the extended and retracted positions of the anti-creep assemblies 60, respectively, by the introduction and exhaustion of air from the housing 66.

Referring to FIGS. 1–3 generally and FIG. 3 specifically, a pair of plates 84 mount the shaft 62 to the frame rails 14. Each plate 84 is welded or otherwise secured to the frame rail 14 and has a bore 87. The shaft 62 is positioned through the bore 87 for rotation relative thereto.

Figure 4:
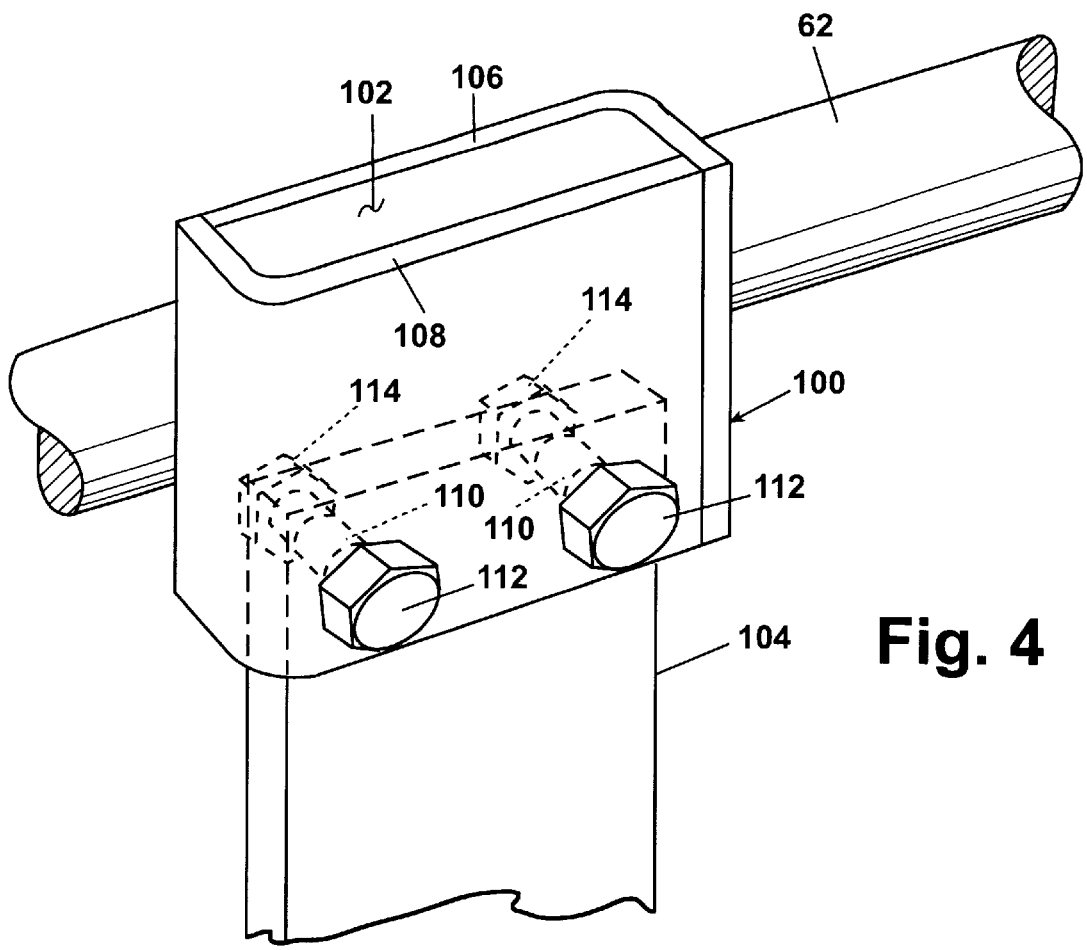
FIG. 4 is an enlarged view of an arm and an arm bracket of the anti-creep device of FIG. 1.

Referring to FIG. 4, each anti-creep assembly 60 includes a bracket 100 mounted to the shaft 62, preferably by welding, and defining a channel 102. An arm 104 is mounted within the channel 102 and is adapted to break away and slide within the channel when the load on the arm exceeds a predetermined design point.

The bracket 100 is preferably constructed of the two L-shaped plates 106, 108, whose edges are welded together. The plate 106 is welded to the shaft 62. Each of the plates 106, 108 and the arm 104 have corresponding apertures 110 in which are received shear bolts 112, which are secured by nuts 114.

The arm 104 is connected to the bracket by a frangible coupling, which for the embodiment of FIGS. 1–5, comprises shear bolts 112. The shear bolts can be made of any suitable material and size as dictated by the predetermined design load at which break away is to occur. The shear bolts are well known.

The shear bolts can be made of any suitable material. For most typical operations, the shear bolts should shear at approximately 50,000 lbs. However, the size and material of the bolts can be selected for any predetermined shear load.

Figure 5:
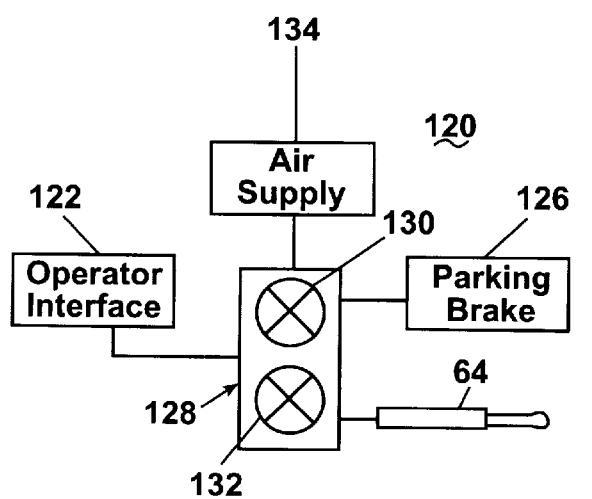
FIG. 5 is a block diagram of a system for operating the anti-creep device.

The operation will be described with respect to FIG. 5, which illustrates a block diagram of a system 120 for operating the anti-creep device. The system 120 includes an operator interface 122 for releasing and setting an air-operated parking or emergency brake 126 that forms part of an air brake actuator (not shown), often referred to as a spring brake actuator. The operator interface is connected to a valve assembly 128 having an air supply valve 130 and an air release valve 132. The air supply and release valves are each in turn connected to the parking brake 126 and the air actuator 64. The parking brake 126 includes a chamber having a rod (not shown) that is normally biased outward of the chamber to apply braking pressure to the wheels of the vehicle in a well known manner. When the air supply valve is open and the air exhaust valve is closed, air under pressure is supplied to the chamber from an air pressure supply source 134, which is connected to the valve 130, to push the rod inwardly of the chamber when the parking brake is released. The air supply 134 typically comprises a compressor for generating compressed air and a tank for storing the compressed air. When an operator sets the parking brake, the air supply valve 130 is closed and the exhaust valve is simultaneously opened to exhaust air from the chamber through the valve 132. The parking brake and its method of operation are well known in the art and, therefore, will not be described in further detail. Since the actuator 64 and parking brake 126 are both connected to the air supply valve 130 and air exhaust valve 132, air pressure is simultaneously supplied to the actuator and parking brake when the valve 130 is opened and the valve 132 is closed and is simultaneously released from the actuator 64 and parking brake 126 when the valve 130 is closed and the valve 132 is opened. The valve assembly 128 thus functions as a pressure switch for controlling operation of the actuator in response to setting and releasing the parking brake.

In operation, as the trailer is being pulled by a tractor, the actuator 64 is pressurized by the air supply 134 that is in fluid contact with the chamber of the parking brake 126 which biases the actuating arm 70 to the second position, extended relative to the housing 66. When the actuator is extended, the arm 104 is in the retracted position. After the trailer is backed up to the loading dock, the driver sets the parking brake by selecting the appropriate setting on the operator interface, which closes the valve 130 and opens the valve the valve 132 to exhaust air from the spring brake actuator, pressure is released against the internal spring in the housing 66, which retracts the actuating arm 70. The retraction of the arm 70 rotates the shaft 62, rotating the arm 104 from the stored to the use position above the trailing arm.

With the arm 104 in place, the trailer is loaded. The continued addition of weight to the trailer moves the trailer downwardly until the arm 104 abuts the trailing arm and prevents the trailer from creeping. If the load transferred through the arm exceeds a predetermined break away load, the shear bolts 104 will shear, resulting in movement by the arm upwardly in the channel 102, and, in turn, the transfer of the load to the air springs 32. This action prevents damage to the trailing arm 22.

By having arm 104 fit snugly in channel 102, arm 104 is retained after shearing of bolts 112 and remains with channel 102. And, more importantly, if a failure in any part of the system allows arm 104 to engage while the vehicle is in motion on the highway, excessive loads will shear bolts 112 and prevent what would be significant damage to the chassis and running gear.

Figure 6:
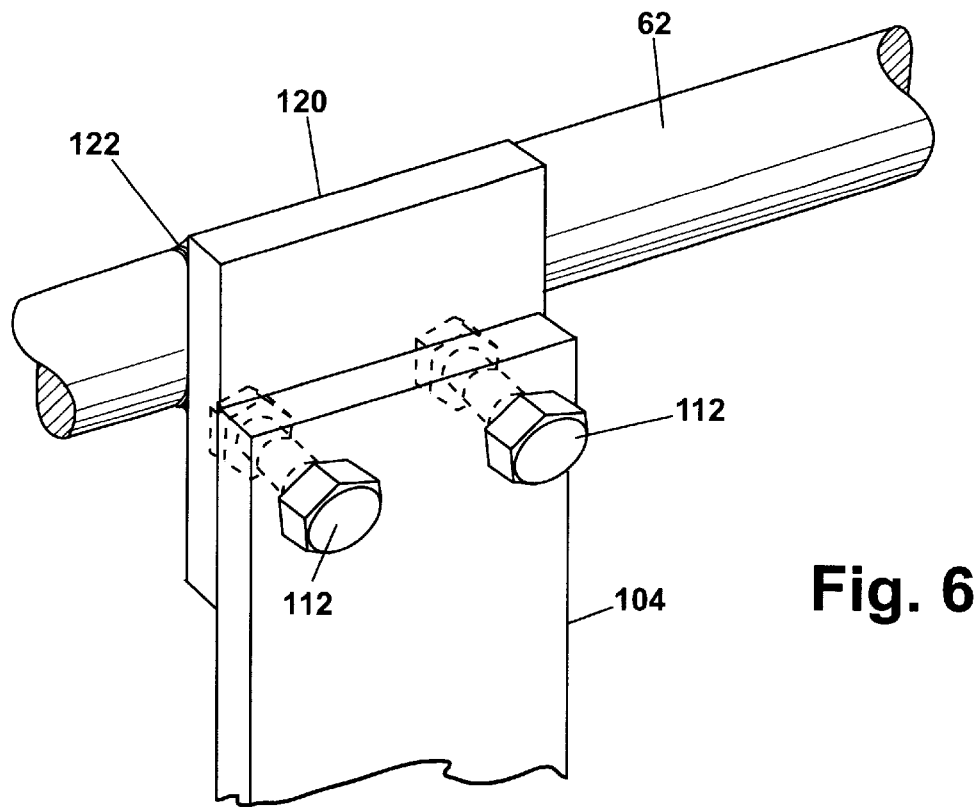
FIG. 6 is an enlarged view, similar to FIG. 4, but illustrating a second embodiment of the anti-creep device according to the invention.

FIG. 6 illustrates a second embodiment of the anti-creep device according to the invention. The second embodiment anti-creep device is similar in many aspects to the first embodiment. Therefore, like parts will be identified by like numerals.

The second embodiment anti-creep device comprises a plate 120 that is welded at 122 to the rod 62. The arm 104 is secured to the plate 120 by shear bolts 112 and nuts 114 as is done in the first embodiment. In essence, the plate 120 functions as a bracket for connecting the arm 104 to the rod 62. The shear bolts 112 function as the frangible coupling to connect the arm 104 to the rod 62 through the plate 120. As with the first embodiment, once the force on the arm 104 reaches a predetermined amount, the shear bolts 112 will break and the arm 104 separates from the plate 120.

Figure 7:
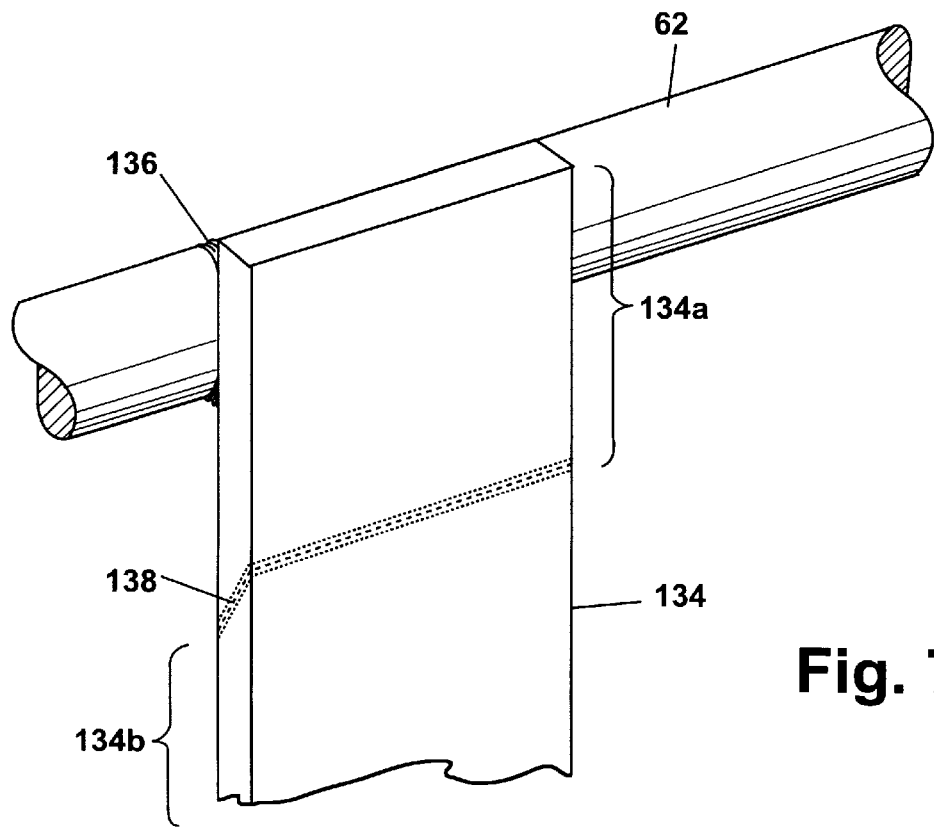
FIG. 7 is an enlarged view, similar to FIG. 4, but illustrating a third embodiment of the anti-creep device according to the invention.

FIG. 7 illustrates a third embodiment of the anti-creep device according to the invention. The third embodiment is similar to the first and second embodiments. Therefore, like parts will be identified by like numerals. The third embodiment comprises an arm 134 whose upper end is directly welded to the rod 62 at 136. The arm 134 has a fracture zone 138, which functionally separates the arm 134 into a coupling portion 134a and a breakaway portion 134b. When the arm is subjected to a load exceeding a predetermined amount, the arm 134 will fracture along the fracture zone 138, separating the breakaway portion 134b from the coupling portion 138.

The fracture zone can be formed in many different ways. For example, the fracture zone 138 can be a reduced cross-sectional area portion of the arm 134, such as a groove formed along part of or about the entire periphery of the arm. Similarly, the fracture zone can also include one or more holes extending partially or completely through the arm along the fracture zone. The fracture zone can also be formed by a material having a lower shear strength than the coupling portion 134a or the breakaway portion 134b of the arm 134. Additionally, the fracture zone can be made of the same material as the coupling portion 134a and the breakaway portion 134b but have different shear strength characteristics formed by treating the material by the addition of heat or chemicals.

Regardless of the form of the fracture zone, it is preferred that the fracture zone be created so that it fractures along an acute angle with respect to the longitudinal axis of the arm 134.

In comparison to the first and second embodiments, the coupling portion 134a functions as the bracket for coupling the arm 134 to the rod 62. The fracture zone functions as the frangible connection coupling the breakaway portion 134b to the coupling portion 134a.

The anti-creep device according to the invention provides a simple and reliable solution to the trailer creep problem. The anti-creep device also can be installed as original equipment or as a retrofit. Advantageously, the anti-creep device prevents damage to the suspension components in an overload condition, without adding substantial complexity or cost.

While the invention has been described with reference to its preferred embodiment, it will be understood by those skilled in the art that various changes may be made and equivalents may be substituted for elements thereof without departing from the spirit and scope of the invention.

What is claimed is:

1. In combination with a trailing arm suspension having a pair of trailing arms, each with a first end rotatably mounted to opposite sides of a trailer frame, an air spring disposed between each trailing arm and the trailer frame to resiliently resist the upward movement of the trailing arms with respect to the frame, and an axle connected to the trailing arms, the axle having opposite ends adapted for mounting a wheel thereto, an anti-creep device comprising at least one support arm mounted to one of the trailer frame and trailing arm suspension for rotational movement between a retracted position and an extended position, the support arm in the extended position being adapted to extend between the trailing arm and trailer frame to prevent relative movement of the axle toward the trailer frame and thereby prevent trailer frame creep, the support arm in the retracted position being disengageable from the suspension and frame so that the axle is free to move relative to the frame, the improvement comprising:

a bracket rotatably mounted to one of the frame and suspension; and a frangible coupling connecting the support arm to the support bracket and designed to fail at a predetermined load below that at which damage will result to the trailer or suspension during loading or operation when the support arm assembly is in the extended position.

2. The combination according to claim 1 wherein the frangible coupling is a shear bolt.

3. The combination according to claim 1 wherein the frangible coupling is a fracture zone of the support arm.

4. The combination according to claim 3 wherein the fracture zone is a portion of the arm having a reduced cross section.

5. The combination according to claim 3 wherein the fracture zone is a portion of the support arm having reduced shear strength properties.

6. The combination according to claim 1 wherein the anti-creep device further comprises a rod adapted to be rotatably mounted to the one of the frame rail and the trailing arm, and the bracket is mounted to the rod whereby rotation of the rod rotates the arm between the extended and retracted position.

7. The combination according to claim 6 wherein the bracket is a plate mounted to the rod.

8. The combination according to claim 6 wherein the bracket defines an axial opening and a portion of the arm is received within the support opening whereby when the frangible coupling breaks, the support arm will slide within the axial opening.

9. The combination according to claim 8 wherein the bracket has opposing sides that at least partially define the axial opening and the frangible coupling comprises at least one shear bolt passing through the support arm and the bracket opposing sides.

10. The combination according to claim 9 wherein the bracket comprises two L-shaped members with the short leg of each L-shaped member being welded to the long leg of the other L-shaped member and one of the sets of long and short legs define the opposing sides.

11. In an anti-creep device for a trailing arm suspension having a pair of trailing arms, each with a first end rotatably mounted to opposite sides of a trailer frame, an air spring disposed between each trailing arm and the trailer frame to resiliently resist the upward movement of the trailing arms with respect to the frame, and an axle connected to the trailing arms, the axle having opposite ends adapted for mounting a wheel thereto, the an anti-creep device comprising at least one support arm adapted to be mounted to one of the trailer frame and trailing arm suspension for rotational movement between a retracted position and an extended position, the support arm in the extended position being adapted to extend between the trailing arm and trailer frame to prevent relative movement of the axle toward the trailer frame and thereby prevent trailer frame creep, the support arm in the retracted position being disengageable from the suspension and frame so that the axle is free to move relative to the frame, and the improvement comprising:

- a bracket adapted to be rotatably mounted to one of the frame and suspension; and
- a frangible coupling connecting the arm to the bracket and designed to fail at a predetermined load below that which damage will result to the support trailer or suspension during loading or operation when the support arm assembly is in the extended position.

12. The combination according to claim 11 wherein the frangible coupling is a shear bolt.

13. The combination according to claim 11 wherein the frangible coupling is a fracture zone of the support arm.

14. The combination according to claim 13 wherein the fracture zone is a portion of the support arm having a reduce cross section.

15. The combination according to claim 13 wherein the fracture zone is a portion of the support arm having reduced shear strength properties.

16. The combination according to claim 11 wherein the anti-creep device further comprises a rod adapted to be rotatably mounted to the one of the frame rail and the trailing arm, and the bracket is mounted to the rod whereby rotation of the rod rotates the support arm between the support extended and retracted position.

17. The combination according to claim 16 wherein the bracket is a plate mounted to the rod.

18. The combination according to claim 16 wherein the bracket defines an axial opening and a portion of the support arm is received within the support opening whereby when the support frangible coupling breaks, the support arm will slide within the support axial opening.

19. The combination according to claim 18 wherein the bracket has opposing sides that at least partially define the axial opening and the frangible coupling comprises at least one shear bolt passing through the support arm and the bracket opposing sides.

20. The combination according to claim 19 wherein the bracket comprises two L-shaped members with the short leg of each L-shaped member being welded to the long leg of the other L-shaped member and one of the sets of long and short legs define the opposing sides.

* * * * *

UNITED STATES PATENT AND TRADEMARK OFFICE
CERTIFICATE OF CORRECTION

PATENT NO. : 6,152,486
DATED : November 28, 2000
INVENTOR(S) : Pierce

It is certified that error appears in the above-identified patent and that said Letters Patent is hereby corrected as shown below:

The Attorney, Agent, or Firm name should read: Rader, Fishman, Grauer & McGarry, an office of Rader, Fishman & Grauer, PLLC.

Claim 8, column 6,
Line 49, "the arm" should read -- the support arm -- and
Line 50, "the support opening" should read -- the opening --.

Claim 11, column 7,
Line 3, "the an" should read -- the --;
Line 16, "the arm" should read -- the support arm --; and
Line 19, "the support trailer" should read -- the trailer --.

Claim 14, column 7,
Line 26, "reduce" should read -- reduced --.

Claim 16, column 8,
Line 8, second instance of "support" should be deleted.

Claim 18, column 8,
Lines 12-16 should read as follows:

18. The combination according to claim 16 wherein the bracket defines an axial opening and a portion of the support arm is received within the opening whereby when the frangible coupling breaks, the support arm will slide within the axial opening.

Signed and Sealed this

Twenty-fifth Day of September, 2001

Attest:

NICHOLAS P. GODICI
Attesting Officer
Acting Director of the United States Patent and Trademark Office